US012503354B2

(12) United States Patent
Kang et al.

(10) Patent No.: US 12,503,354 B2
(45) Date of Patent: Dec. 23, 2025

(54) WATER PURIFIER

(71) Applicant: COWAY CO., LTD., Gongju-si (KR)

(72) Inventors: Hee Joo Kang, Gongju-si (KR); Hee Do Jung, Gongju-si (KR); Jong Hwan Lee, Gongju-si (KR); Hyun Kang Lee, Gongju-si (KR); Byung Hyo Ye, Gongju-si (KR); Seong Min Park, Gongju-si (KR); Dong Min Oh, Gongju-si (KR); Seung Won Lee, Gongju-si (KR)

(73) Assignee: COWAY CO., LTD., Gongju-si (KR)

(*) Notice: Subject to any disclaimer, the term of this patent is extended or adjusted under 35 U.S.C. 154(b) by 78 days.

(21) Appl. No.: 18/700,376

(22) PCT Filed: Sep. 2, 2022

(86) PCT No.: PCT/KR2022/013200
§ 371 (c)(1),
(2) Date: Apr. 11, 2024

(87) PCT Pub. No.: WO2023/063577
PCT Pub. Date: Apr. 20, 2023

(65) Prior Publication Data

US 2024/0400366 A1 Dec. 5, 2024

(30) Foreign Application Priority Data

Oct. 14, 2021 (KR) ........................ 10-2021-0136796

(51) Int. Cl.
*B67D 1/08* (2006.01)

(52) U.S. Cl.
CPC ......... *B67D 1/0857* (2013.01); *B67D 1/0801* (2013.01); *B67D 1/0859* (2013.01);
(Continued)

(58) Field of Classification Search
CPC ...... B67D 1/00; B67D 1/0014; B67D 1/0081; B67D 1/0857; B67D 1/0858;
(Continued)

(56) References Cited

U.S. PATENT DOCUMENTS 6,508,070 B1 * 1/2003 Palmer ................ B67D 1/0857 62/201

FOREIGN PATENT DOCUMENTS

EP 2 930 276 A1 10/2015
JP 2007-75809 A 3/2007

(Continued)

OTHER PUBLICATIONS

International Search Report issued Dec. 13, 2022 in PCT/KR2022/013200, filed on Sep. 2, 2022, 2 pages.

*Primary Examiner* — Joseph F Trpisovsky
(74) *Attorney, Agent, or Firm* — Oblon, McClelland, Maier & Neustadt, L.L.P.

(57) ABSTRACT

The present disclosure relates to a water purifier. The water purifier according to the present disclosure includes: a tank providing an accommodation space, which extends in an up-down direction to accommodate purified water generated by filtering raw water and of which the maximum length in a height direction is at least three times the maximum length in a width direction or more, and provided so that the purified water is introduced through an upper side of the accommodation space; a cold water generator configured to cool the purified water accommodated in the accommodation space and generate cold water; a cold water dispensing flow path provided to dispense the cold water generated in the accommodation space to the outside; and an upper clamp assembly, an intermediate clamp assembly, and a lower clamp assembly provided to effectively respond to pressure that acts on the tank in the up-down direction.

14 Claims, 8 Drawing Sheets

(52) U.S. Cl.
CPC .............. *B67D 2210/00002* (2013.01); *B67D 2210/00031* (2013.01)

(58) Field of Classification Search
CPC ........ B67D 1/0859; B67D 2210/00002; B67D 2210/00031; B67D 2210/00104; F16J 15/00; F16J 15/002; F25D 2331/806
See application file for complete search history.

(56) References Cited

FOREIGN PATENT DOCUMENTS

| | | | |
|---|---|---|---|
| KR | 10-2009-021911 | A | 3/2009 |
| KR | 10-2011-0033464 | A | 3/2011 |
| KR | 10-1990441 | B1 | 6/2019 |
| KR | 10-2019-0115270 | A | 10/2019 |
| KR | 10-2247220 | B1 | 5/2021 |

* cited by examiner

370 : 370a, 370b

WATER PURIFIER

TECHNICAL FIELD

The present disclosure relates to a water purifier, and more particularly, to a water purifier that can generate and provide cold water by cooling purified water.

BACKGROUND ART

Water purifiers are devices that filter raw water supplied from the outside to generate purified water. In addition to supplying purified water, water purifiers also cool the purified water to generate and supply cold water. Conventional water purifiers that can supply cold water generally have a cold water storage tank in which a considerable amount of cold water is stored.

Korean Unexamined Patent Application Publication No. 10-2019-0115270 of Coway Co., Ltd. discloses a water purifier having a cold water tank. The water purifier includes the cold water tank and a cold water receiving flow path, a cold water extraction flow path, and the like connected to the cold water tank.

Meanwhile, in recent years, with an increase in user demand for freshness and hygiene of purified water and the size reduction trend of products, direct water purifiers that do not have a storage tank with a large storage capacity are being supplied. Generally, direct water purifiers have a cold water tank with a smaller capacity than a conventional storage tank, and purified water may be cooled and generated as cold water while temporarily stagnating or flowing in the cold water tank.

Korean Patent Registration No. 10-2247220 of Coway Co., Ltd. discloses a direct water purifier that can generate cold water. According to such a direct water purifier, there is an effect of generating cold water directly through a cooler that cools purified water, which is generated by filtering raw water, to generate cold water. However, configurations relating to a specific structure and shape of a cold water tank of the direct water purifier are not disclosed.

In this circumstance, research on the structure and shape of a cold water tank of a direct water purifier that can provide cold water is being carried out. Since cold water is generated inside the cold water tank, the structure and shape of the cold water tank should primarily improve efficiency of cold water generation. Also, since purified water is cooled while temporarily stagnating or flowing in the cold water tank of the direct water purifier, the cold water tank of the direct water purifier needs to have pressure resistance that allows the cold water tank to withstand pressure caused by expansion occurring in a process in which the purified water is generated as cold water.

(Patent Document 1) Korean Unexamined Patent Application Publication No. 10-2019-0115270

(Patent Document 2) Korean Patent Registration No. 10-2247220

DISCLOSURE

Technical Problem

The present disclosure is directed to a water purifier that improves cooling efficiency through a cold water tank having a long length in an up-down direction and effectively responds to pressure generated inside the cold water tank.

One embodiment of the present disclosure is directed to a water purifier that ensures stable pressure resistance despite water hammering that occurs in an up-down direction for structural reasons in a cold water tank having a long length in the up-down direction.

One embodiment of the present disclosure is directed to a water purifier that effectively achieves sealing of a coupling portion of a cold water tank.

One embodiment of the present disclosure is directed to a water purifier that improves cold water generation efficiency of a direct water purifier through a structure of a cold water tank and arrangement of a cold water generator.

One embodiment of the present disclosure is directed to a water purifier that improves cold water generation efficiency of a direct water purifier through structures of a cold water tank and a cold water dispensing flow path.

Technical Solution

The present disclosure provides a water purifier including: a tank providing an accommodation space, which extends in an up-down direction to accommodate purified water generated by filtering raw water and of which the maximum length in a height direction is at least three times the maximum length in a width direction or more, and provided so that the purified water is introduced through an upper side of the accommodation space; a cold water generator configured to cool the purified water accommodated in the accommodation space and generate cold water; and a cold water dispensing flow path provided to dispense the cold water generated in the accommodation space to the outside, wherein the tank includes an upper housing having a cylindrical shape that extends in the up-down direction and providing an upper portion of the accommodation space, a lower housing having a cylindrical shape that extends in the up-down direction and connected to a lower portion of the upper housing to provide a lower portion of the accommodation space, an upper cap coupled to an upper side end of the upper housing to seal the accommodation space from outside air, and a lower cap coupled to a lower side end of the lower housing to seal the accommodation space from the outside air, a coupling portion between the upper housing and the upper cap, a coupling portion between the upper housing and the lower housing, and a coupling portion between the lower housing and the lower cap protrude radially outward past portions adjacent thereto, and the tank further includes an upper clamp assembly in which a plurality of segments are fastened to surround the coupling portion between the upper housing and the upper cap, an intermediate clamp assembly in which a plurality of segments are fastened to surround the coupling portion between the upper housing and the lower housing, and a lower clamp assembly in which a plurality of segments are fastened to surround the coupling portion between the lower housing and the lower cap.

In the water purifier according to one embodiment of the present disclosure, the plurality of segments of each of the upper clamp assembly, the intermediate clamp assembly, and the lower clamp assembly may have a groove provided at an inner circumferential surface thereof, and the coupling portion between the upper housing and the upper cap, the coupling portion between the upper housing and the lower housing, and the coupling portion between the lower housing and the lower cap may be inserted into the grooves.

In the water purifier according to one embodiment of the present disclosure, the plurality of segments of each of the upper clamp assembly, the intermediate clamp assembly, and the lower clamp assembly may be fastened in a direction perpendicular to the height direction of the tank.

In the water purifier according to one embodiment of the present disclosure, the upper housing may include a first diameter expansion portion provided with an expanded diameter at the upper side end, and the upper cap may be inserted into and seated on the first diameter expansion portion.

In the water purifier according to one embodiment of the present disclosure, the upper cap may have a first sealing member insertion groove provided in an outer circumferential surface in a circumferential direction, and the tank may further include a first sealing member seated on the first sealing member insertion groove to seal between an inner circumferential surface of the first diameter expansion portion and the outer circumferential surface of the upper cap.

In the water purifier according to one embodiment of the present disclosure, the upper housing may further include a first seating groove provided to be recessed in an inner circumferential surface of an upper end of the first diameter expansion portion in a circumferential direction, and an edge of an upper end of the upper cap may be seated on the first seating groove.

In the water purifier according to one embodiment of the present disclosure, the lower housing may include a second diameter expansion portion provided with an expanded diameter at an upper side end, and a lower side end of the upper housing may be inserted into and seated on the second diameter expansion portion.

In the water purifier according to one embodiment of the present disclosure, the upper housing may have a second sealing member insertion groove provided in an outer circumferential surface of the lower side end in a circumferential direction, and the tank may further include a second sealing member seated on the second sealing member insertion groove to seal between an inner circumferential surface of the second diameter expansion portion and the outer circumferential surface of the lower side end of the upper housing.

In the water purifier according to one embodiment of the present disclosure, the lower housing may further include a second seating groove provided to be recessed in an inner circumferential surface of an upper end of the second diameter expansion portion in a circumferential direction, and the upper housing may further include a flange provided at the lower side end and seated on the second seating groove.

In the water purifier according to one embodiment of the present disclosure, the lower housing may include a third diameter expansion portion provided with an expanded diameter at the lower side end, and the lower cap may be inserted into and seated on the third diameter expansion portion.

In the water purifier according to one embodiment of the present disclosure, the lower cap may have a third sealing member insertion groove provided in an outer circumferential surface in a circumferential direction, and the tank may further include a third sealing member seated on the third sealing member insertion groove to seal between an inner circumferential surface of the third diameter expansion portion and the outer circumferential surface of the lower cap.

In the water purifier according to one embodiment of the present disclosure, the lower housing may further include a third seating groove provided to be recessed in an inner circumferential surface of a lower end of the third diameter expansion portion in a circumferential direction, and an edge of a lower end of the lower cap may be seated on the third seating groove.

In the water purifier according to one embodiment of the present disclosure, the cold water generator may include a refrigerant flow path provided so that a refrigerant which cools the purified water accommodated in the accommodation space to generate cold water is introduced through the upper side of the accommodation space and flows to the upper side of the accommodation space via the lower portion of the accommodation space and a compressor configured to provide a flow force to the refrigerant disposed in the refrigerant flow path.

In the water purifier according to one embodiment of the present disclosure, the cold water dispensing flow path may include a first dispensing flow path which communicates with the accommodation space through the lower cap, causes the cold water to be discharged to a lower portion of the tank, and then switches a flow direction of the cold water to an upward direction to cause the cold water to flow toward a bottom of the accommodation space, a second dispensing flow path which is connected to the first dispensing flow path, extends to the upper side of the accommodation space, and causes the cold water to flow to the upper portion of the accommodation space, and a third dispensing flow path which is connected to the second dispensing flow path at the upper portion of the accommodation space, extends toward a side surface of the accommodation space to pass through a side surface of the tank, and causes the cold water to be discharged to the outside.

Advantageous Effects

According to the above configuration, a water purifier according to the present disclosure provides an effect of improving cooling efficiency through a cold water tank having a long length in an up-down direction and effectively responding to pressure generated inside the cold water tank.

A water purifier according to one embodiment of the present disclosure provides an effect of ensuring stable pressure resistance despite water hammering that occurs in an up-down direction for structural reasons in a cold water tank having a long length in the up-down direction.

A water purifier according to one embodiment of the present disclosure provides an effect of effectively achieving sealing of a coupling portion of a cold water tank.

A water purifier according to one embodiment of the present disclosure provides an effect of improving cold water generation efficiency of a direct water purifier through a structure of a cold water tank and arrangement of a cold water generator.

A water purifier according to one embodiment of the present disclosure provides an effect of improving cold water generation efficiency of a direct water purifier through structures of a cold water tank and a cold water dispensing flow path.

MODES OF THE DISCLOSURE

Figure 1:
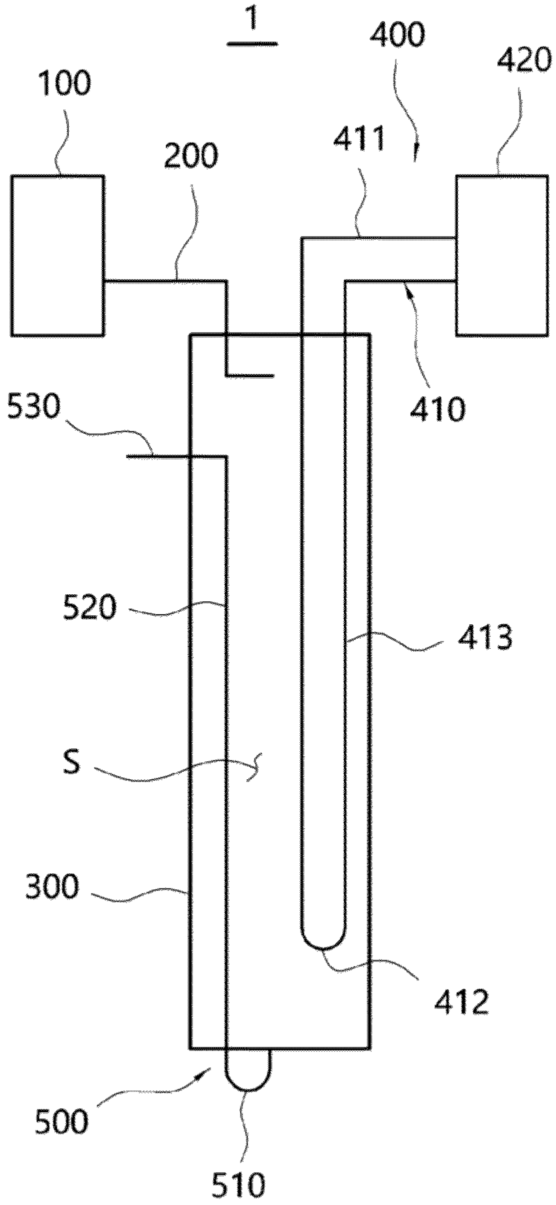
FIG. 1 is a configuration diagram of a water purifier according to one embodiment of the present disclosure.

Words or terms used in the specification and the claims should not be interpreted as being limited to their general or dictionary meanings and should be interpreted to have meanings and concepts consistent with the technical spirit of the present disclosure, according to the principle that the inventor may define terms and concepts thereof in order to describe his or her disclosure in the best possible way.

The embodiments described in the specification and the configurations illustrated in the drawings are only exemplary embodiments of the present disclosure and do not represent the entire technical spirit of the present disclosure, and thus various equivalents and modifications that can replace the embodiments may be present at the time of filing this application.

In the present specification, terms such as “include” or “have” are intended to describe the presence of features, numbers, steps, operations, components, parts, or combinations thereof mentioned herein and should not be understood as precluding the possibility of presence or addition of one or more other features, numbers, steps, operations, components, parts, or combinations thereof.

When a certain component is described as being “in front of,” “behind,” “above,” or “under” another component, unless there is some special circumstance, this not only includes a case in which the component is disposed right “in front of,” “behind,” “above,” or “under” the other component, but also includes a case in which another component is disposed between the two components. Also, when a certain component is described as being “connected” to another component, unless there is some special circumstance, this not only includes a case in which the component and the other component are directly connected to each other, but also includes a case in which the component and the other component are indirectly connected to each other.

Hereinafter, a water purifier according to embodiments of the present disclosure will be described with reference to the accompanying drawings.

FIG. 1 is a configuration diagram of a water purifier according to one embodiment of the present disclosure.

A water purifier 1 according to one embodiment of the present disclosure filters raw water supplied from the outside and provides purified water. The water purifier 1 according to one embodiment of the present disclosure may be a direct water purifier that does not have a storage tank. Also, the water purifier 1 according to one embodiment of the present disclosure may cool purified water to generate and supply cold water.

Referring to FIG. 1, the water purifier 1 according to one embodiment of the present disclosure may include a purified water generator 100, a purified water supply flow path 200, a tank 300, a cold water generator 400, and a cold water dispensing flow path 500.

The purified water generator 100 filters raw water supplied from the outside and generates purified water. The purified water generator 100 may include a raw water receiving flow path through which the raw water is introduced, one or more filters configured to filter the raw water, and the like.

The purified water supply flow path 200 supplies purified water generated by the purified water generator 100. In one embodiment of the present disclosure, the purified water supply flow path 200 supplies the purified water generated by the purified water generator 100 to the tank 300. More specifically, one side end of the purified water supply flow path 200 may be connected to the purified water generator 100, and the other side end thereof may be disposed to be exposed at an upper side of an accommodation space S formed inside the tank 300.

The tank 300 provides the accommodation space S, which extends in an up-down direction to accommodate the purified water generated by filtering the raw water and of which the maximum length in a height direction is at least three times the maximum length in a width direction or more, and is provided so that the purified water is introduced through an upper side of the accommodation space S. The purified water is cooled while temporarily stagnating or flowing in the accommodation space S provided by the tank 300, and in this way, cold water is generated.

Figure 2:
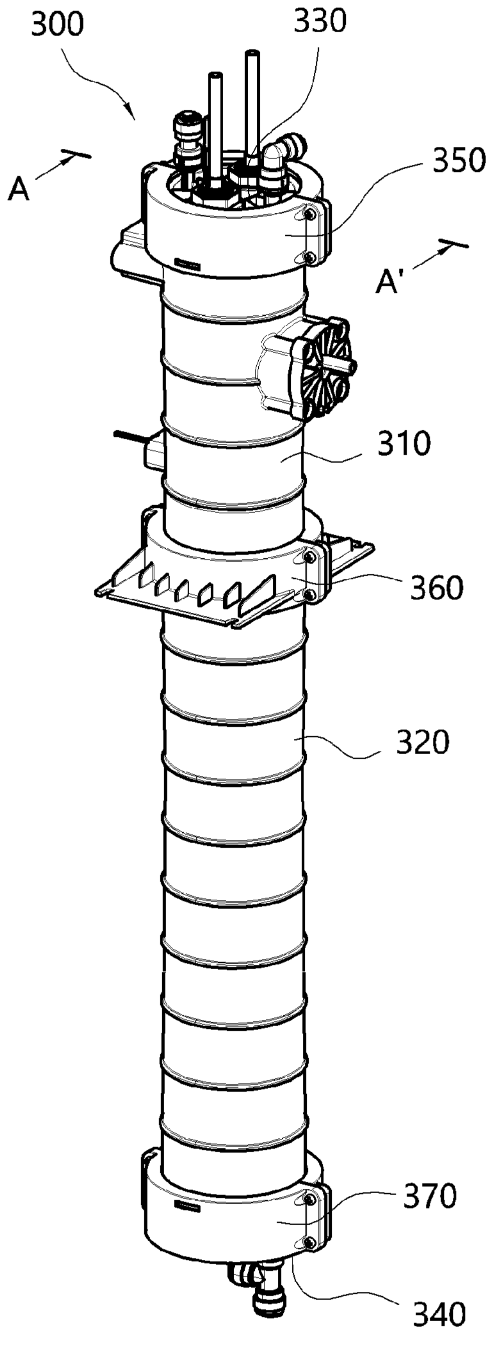
FIG. 2 is a perspective view of a tank of the water purifier according to one embodiment of the present disclosure.
Figure 3:
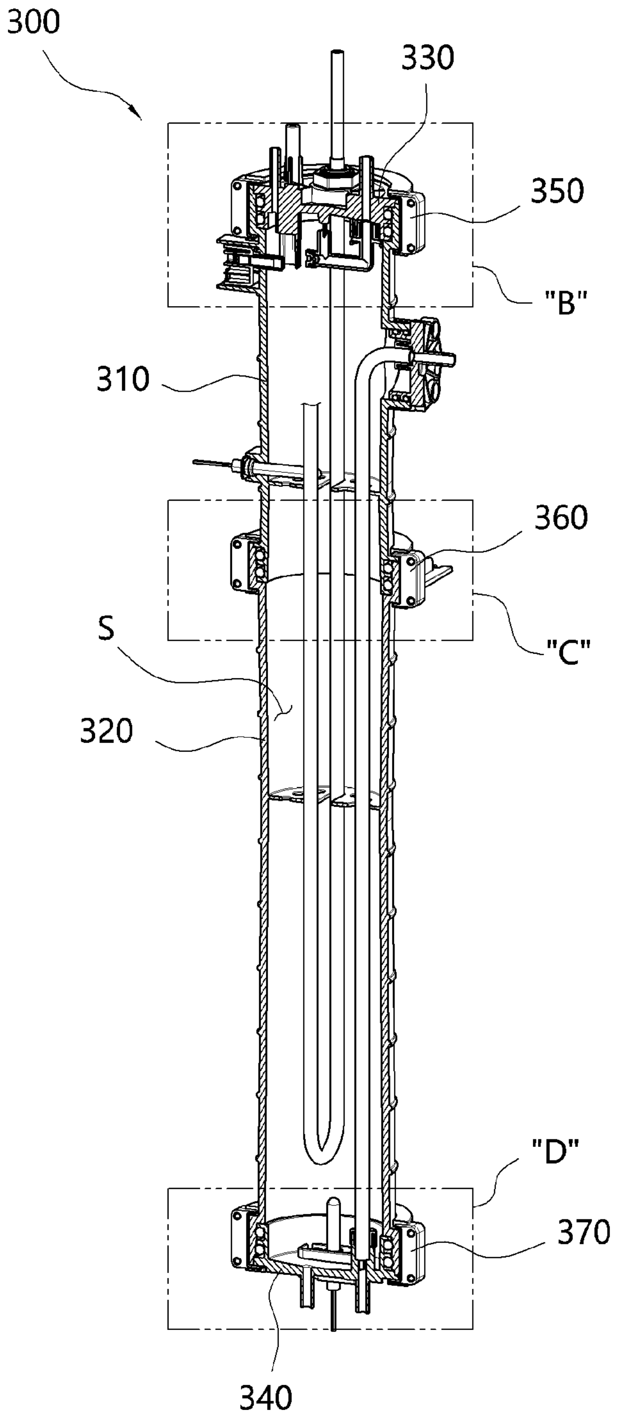
FIG. 3 is a cross-sectional view along line A-A' of FIG. 2.

FIG. 2 is a perspective view of a tank of the water purifier according to one embodiment of the present disclosure, and FIG. 3 is a cross-sectional view along line A-A' of FIG. 2. Referring to FIGS. 2 and 3, the tank 300 may have a form that is sealed from outside air and may be disposed in an upright form on the ground. That is, the accommodation space S provided inside the tank 300 may be sealed from outside air. Also, the tank 300 may have a cylindrical shape.

In one embodiment of the present disclosure, the tank 300 includes an upper housing 310, a lower housing 320, an upper cap 330, and a lower cap 340. The upper housing 310 has a cylindrical shape that extends in the up-down direction and provides an upper portion of the accommodation space S. The lower housing 320 has a cylindrical shape that extends in the up-down direction and is connected to a lower portion of the upper housing 310 to provide a lower portion of the accommodation space S. In a state in which the upper housing 310 and the lower housing 320 are connected, the upper portion of the accommodation space S provided by the upper housing 310 and the lower portion of the accommodation space S provided by the lower housing 320 communicate. The upper cap 330 is coupled to an upper side end of the upper housing 310 for the accommodation space S to be sealed from outside air. Also, the lower cap 340 is coupled to a lower side end of the lower housing 320 for the accommodation space S to be sealed from the outside air.

A coupling portion between the upper housing 310 and the upper cap 330, a coupling portion between the upper housing 310 and the lower housing 320, and a coupling portion between the lower housing 320 and the lower cap 340 protrude radially outward past portions adjacent thereto. Also, the tank 300 includes an upper clamp assembly 350 fastened to surround the coupling portion between the upper housing 310 and the upper cap 330, an intermediate clamp assembly 360 fastened to surround the coupling portion between the upper housing 310 and the lower housing 320, and a lower clamp assembly 370 fastened to surround the coupling portion between the lower housing 320 and the lower cap 340.

When a cooling action is performed in the accommodation space S in a state in which the tank 300 is sealed, expansion occurs in a process in which purified water is cooled and generated as cold water, and pressure of a predetermined amount or more is generated inside the tank 300. Accordingly, water hammering may occur inside the tank 300. However, when the tank 300 has a form extending in the up-down direction and having a relatively longer length in the height direction, the action of the pressure tends to focus in the up-down direction. However, according to the present disclosure, since the upper clamp assembly 350, the intermediate clamp assembly 360, and the lower clamp assembly 370 have a fastening force perpendicular to the height direction of the tank 300, the pressure acting in the up-down direction of the tank 300 may be efficiently offset.

Figure 4:
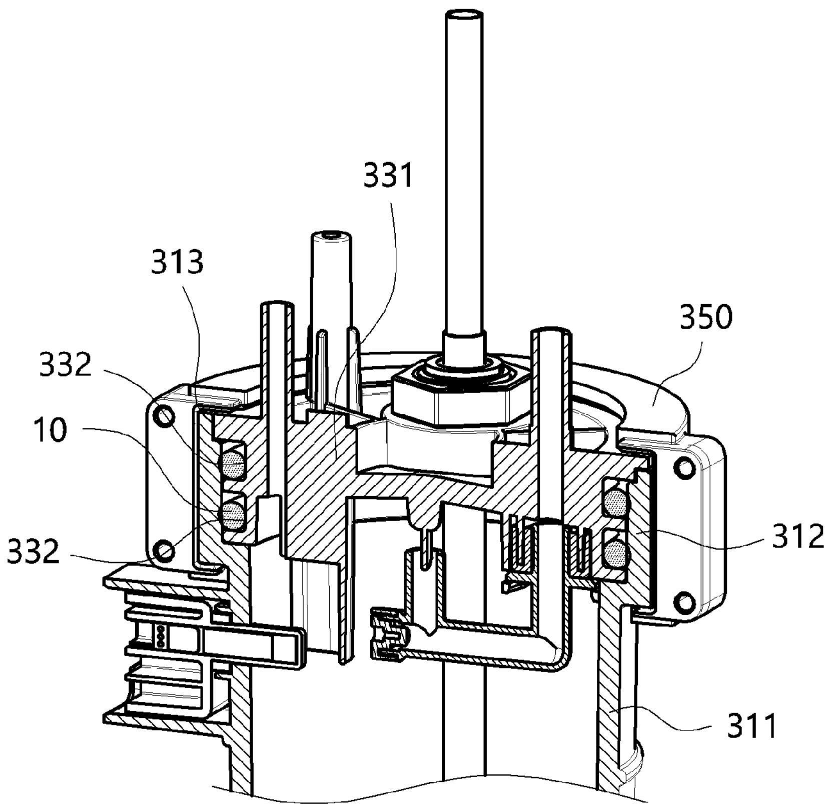
FIG. 4 is an enlarged view of portion B of FIG. 3.
Figure 5:
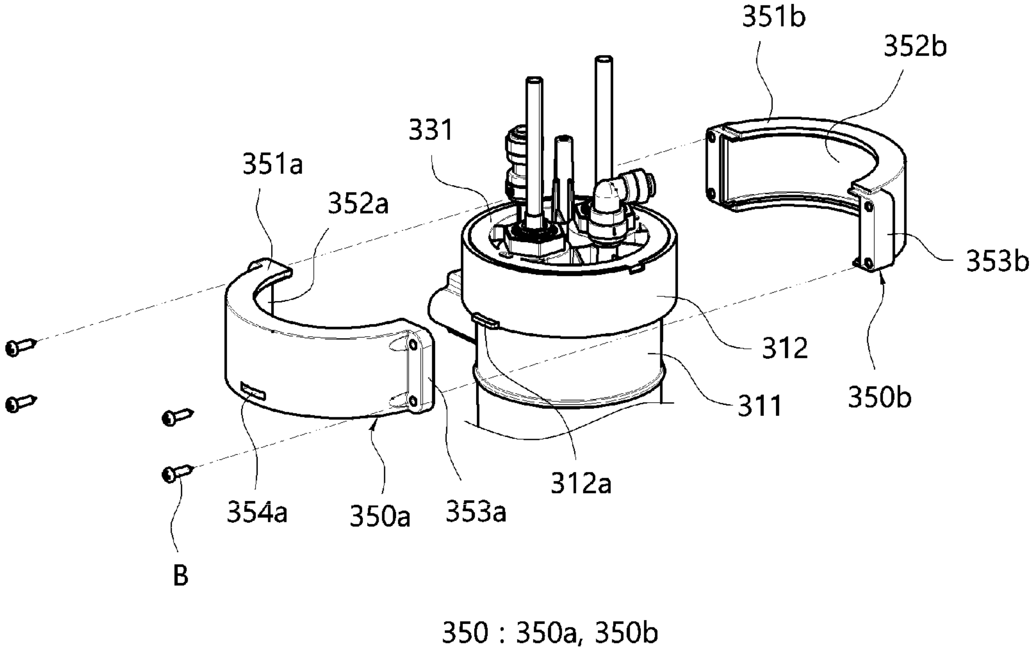
FIG. 5 is a view illustrating an exploded state of an upper clamp assembly at an upper end of the tank of the water purifier according to one embodiment of the present disclosure.

FIG. 4 is an enlarged view of portion B of FIG. 3, and FIG. 5 is a view illustrating an exploded state of an upper clamp assembly at an upper end of the tank of the water purifier according to one embodiment of the present disclosure.

Referring to FIGS. 4 and 5, in the upper clamp assembly 350, a plurality of segments 350*a* and 350*b* are fastened to surround the coupling portion between the upper housing 310 and the upper cap 330. The plurality of segments 350*a* and 350*b* are fastened to surround an upper side, a lower side, and an outer circumferential surface of the coupling portion between the upper housing 310 and the upper cap 330 that protrudes radially outward and thus provide a fastening force in the horizontal direction perpendicular to the height direction of the tank 300. Accordingly, the upper clamp assembly 350 may effectively resist pressure acting in the height direction of the tank 300.

The upper housing 310 includes an upper housing body 311 providing the accommodation space S and having a vertically extending tubular shape and a first diameter expansion portion 312 having an expanded diameter and connected to an upper side end of the upper housing body 311, and the upper cap 330 is inserted into and seated on the first diameter expansion portion 312. Due to such a structure, the coupling portion between the upper housing 310 and the upper cap 330 has a form that protrudes radially outward.

Meanwhile, the upper cap 330 has an upper cap body 331 configured to seal the upper portion of the accommodation space and be inserted into the first diameter expansion portion 312 and a first sealing member insertion groove 332 recessed in an outer circumferential surface of the upper cap body 331 in the circumferential direction. A first sealing member 10 is seated on the first sealing member insertion groove 332 to seal between an inner circumferential surface of the first diameter expansion portion and the outer circumferential surface of the upper cap. For example, the first sealing member 10 may be an O-ring.

Here, a first seating groove 313 may be provided to be recessed in an inner circumferential surface of an upper end of the first diameter expansion portion 312 in the circumferential direction. An edge of an upper end of the upper cap 330 may be seated on the first seating groove 313. Through such a structure, the upper housing 310 and the upper cap 330 may be stably coupled to each other.

The upper clamp assembly 350 includes a first upper clamp segment 350*a* and a second upper clamp segment 350*b*. The first upper clamp segment 350*a* and the second upper clamp segment 350*b* are each disposed to partially cover the coupling portion between the upper housing 310 and the upper cap 330 in the circumferential direction. In a state in which the first upper clamp segment 350*a* and the second upper clamp segment 350*b* are fastened, the coupling portion between the upper housing 310 and the upper cap 330 is entirely covered.

In one embodiment of the present disclosure, the first upper clamp segment 350*a* has a first upper clamp segment body 351*a* having a semicylindrical shape, a first upper clamp segment groove 352*a* formed to be recessed in an inner circumferential surface of the first upper clamp segment body 351*a*, and a first upper clamp segment fastening portion 353*a* formed to protrude radially outward from both ends of the first upper clamp segment body 351*a*. Also, the second upper clamp segment 350*b* has a second upper clamp segment body 351*b* having a semicylindrical shape, a second upper clamp segment groove 352*b* formed to be recessed in an inner circumferential surface of the second upper clamp segment body 351*b*, and a second upper clamp segment fastening portion 353*b* formed to protrude radially outward from both ends of the second upper clamp segment body 351*b*.

In a state in which the first upper clamp segment 350*a* and the second upper clamp segment 350*b* are disposed to come in contact so that the coupling portion between the upper housing 310 and the upper cap 330 is inserted into the first upper clamp segment groove 352*a* and the second upper clamp segment groove 352*b*, the first upper clamp segment 350*a* and the second upper clamp segment 350*b* are fastened to each other by a fastening member B fastened to pass through the first upper clamp segment fastening portion 353*a* and the second upper clamp segment fastening portion 353*b*. Here, the fastening member B may be fastened in a direction perpendicular to the up-down direction (the height direction of the tank 300), that is, the horizontal direction.

Meanwhile, the first upper clamp segment 350*a* may further have a guide groove 354*a* formed to pass through the first upper clamp segment body 351*a*. Corresponding to the guide groove 354*a*, a guide protrusion 312*a* configured to be inserted into the guide groove 354*a* may be provided on an outer circumferential surface of the first diameter expansion portion 312 of the upper housing 310. The guide groove 354*a* and the guide protrusion 312*a* serve to guide a fastening position of the upper clamp assembly 350. Of course, although not illustrated in the drawings, the second upper clamp segment 350*b* may also have a guide groove, and a guide protrusion corresponding thereto may be provided on the outer circumferential surface of the first diameter expansion portion 312.

Figure 6:
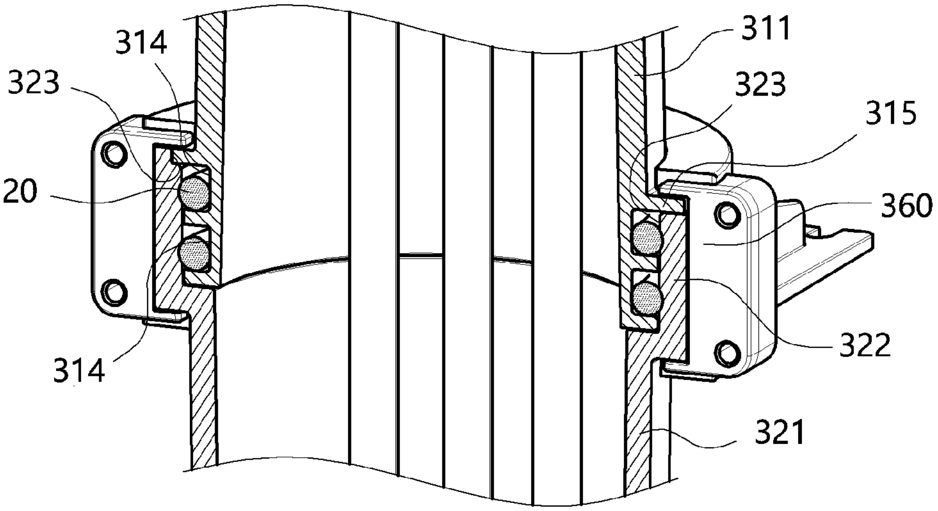
FIG. 6 is an enlarged view of portion C of FIG. 3.
Figure 7:
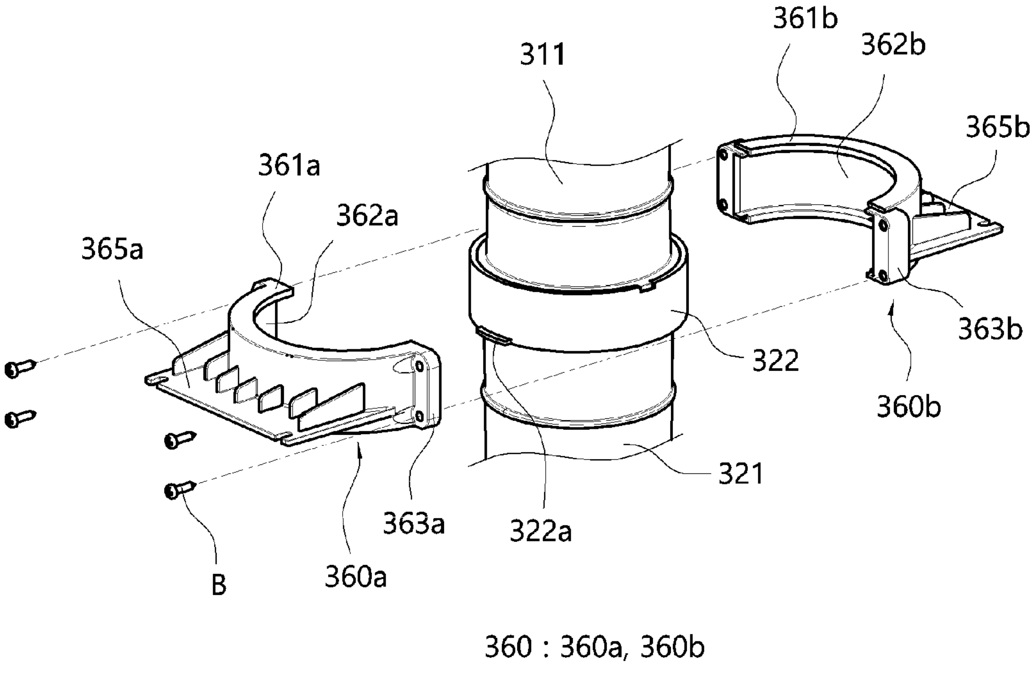
FIG. 7 is a view illustrating an exploded state of an intermediate clamp assembly at a coupling portion between an upper housing and a lower housing of the tank of the water purifier according to one embodiment of the present disclosure.

FIG. 6 is an enlarged view of portion C of FIG. 3, and FIG. 7 is a view illustrating an exploded state of an intermediate clamp assembly at a coupling portion between an upper housing and a lower housing of the tank of the water purifier according to one embodiment of the present disclosure.

Referring to FIGS. 6 and 7, in the intermediate clamp assembly 360, a plurality of segments 360*a* and 360*b* are fastened to surround the coupling portion between the upper housing 310 and the lower housing 320. The plurality of segments 360*a* and 360*b* are fastened to surround an upper side, a lower side, and an outer circumferential surface of the coupling portion between the upper housing 310 and the lower housing 320 that protrudes radially outward and thus provide a fastening force in the horizontal direction perpendicular to the height direction of the tank 300. Accordingly, the intermediate clamp assembly 360 may effectively resist pressure acting in the height direction of the tank 300.

The lower housing 320 includes a lower housing body 321 providing the accommodation space S and having a vertically extending tubular shape and a second diameter expansion portion 322 having an expanded diameter and connected to an upper side end of the lower housing body 321, and a lower side end of the upper housing 310 is inserted into and seated on the second diameter expansion portion 322. Due to such a structure, the coupling portion between the upper housing 310 and the lower housing 320 has a form that protrudes radially outward.

Meanwhile, the upper housing 310 has a second sealing member insertion groove 314 provided in an outer circumferential surface of the lower side end in the circumferential direction. A second sealing member 20 is seated on the second sealing member insertion groove 314 to seal between an inner circumferential surface of the second diameter expansion portion 322 and the outer circumferential surface of the lower side end of the upper housing 310. For example, the second sealing member 20 may be an O-ring.

Here, a second seating groove 323 may be provided to be recessed in an inner circumferential surface of an upper end of the second diameter expansion portion 322 in the circumferential direction. Corresponding to the second seating groove 323, the upper housing 310 has a flange 315, which is configured to be seated on the second seating groove 323, provided at the lower side end. The flange 315 may protrude radially outward from an upper end of the second sealing member insertion groove 314. Through such a structure, the upper housing 310 and the lower housing 320 may be stably coupled to each other.

The intermediate clamp assembly 360 includes a first intermediate clamp segment 360*a* and a second intermediate clamp segment 360*b*. The first intermediate clamp segment 360*a* and the second intermediate clamp segment 360*b* are each disposed to partially cover the coupling portion between the upper housing 310 and the lower housing 320 in the circumferential direction. In a state in which the first intermediate clamp segment 360*a* and the second intermediate clamp segment 360*b* are fastened, the coupling portion between the upper housing 310 and the lower housing 320 is entirely covered.

In one embodiment of the present disclosure, the first intermediate clamp segment 360*a* has a first intermediate clamp segment body 361*a* having a semicylindrical shape, a first intermediate clamp segment groove 362*a* formed to be recessed in an inner circumferential surface of the first intermediate clamp segment body 361*a*, and a first intermediate clamp segment fastening portion 363*a* formed to protrude radially outward from both ends of the first intermediate clamp segment body 361*a*. Also, the second intermediate clamp segment 360*b* has a second intermediate clamp segment body 361*b* having a semicylindrical shape, a second intermediate clamp segment groove 362*b* formed to be recessed in an inner circumferential surface of the second intermediate clamp segment body 361*b*, and a second intermediate clamp segment fastening portion 363*b* formed to protrude radially outward from both ends of the second intermediate clamp segment body 361*b*.

In a state in which the first intermediate clamp segment 360*a* and the second intermediate clamp segment 360*b* are disposed to come in contact so that the coupling portion between the upper housing 310 and the lower housing 320 is inserted into the first intermediate clamp segment groove 362*a* and the second intermediate clamp segment groove 362*b*, the first intermediate clamp segment 360*a* and the second intermediate clamp segment 360*b* are fastened to each other by a fastening member B fastened to pass through the first intermediate clamp segment fastening portion 363*a* and the second intermediate clamp segment fastening portion 363*b*. Here, the fastening member B may be fastened in a direction perpendicular to the up-down direction (the height direction of the tank 300), that is, the horizontal direction.

Meanwhile, the first intermediate clamp segment 360*a* may further have a guide groove formed to pass through the first intermediate clamp segment body 361*a*. Corresponding to the guide groove, a guide protrusion 322*a* configured to be inserted into the guide groove may be provided on an outer circumferential surface of the second diameter expansion portion 322 of the lower housing 320. The guide groove and the guide protrusion 322*a* serve to guide a fastening position of the intermediate clamp assembly 360. Of course, the second intermediate clamp segment 360*b* may also have a guide groove, and a guide protrusion corresponding thereto may be provided on the outer circumferential surface of the second diameter expansion portion 322.

Also, the first intermediate clamp segment 360*a* may further have a first protrusion 365*a* that protrudes outward from the first intermediate clamp segment body 361*a*, and the second intermediate clamp segment 360*b* may further have a second protrusion 365*b* that protrudes outward from the second intermediate clamp segment body 361*b*. In one embodiment of the present disclosure, the tank 300 may be coupled to a frame disposed at a height that is a predetermined distance from an installation surface on which the water purifier 1 is installed, and the first protrusion 365*a* and the second protrusion 365*b* may be fastened to the frame. The first protrusion 365*a* and the second protrusion 365*b* may each have a plate shape and have one or more ribs provided on an upper surface to protrude therefrom in the up-down direction.

Figure 8:
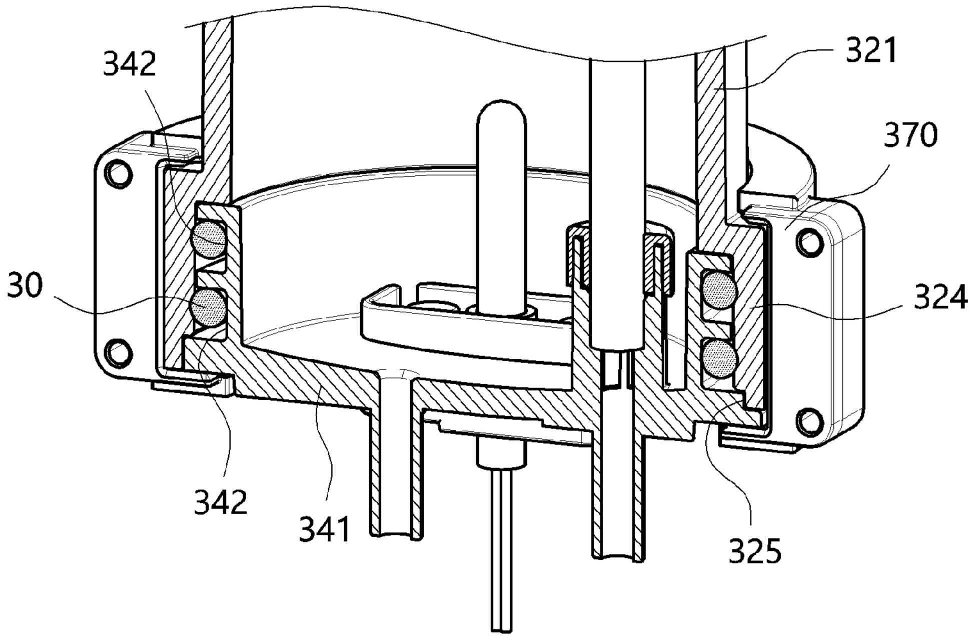
FIG. 8 is an enlarged view of portion D of FIG. 3.
Figure 9:
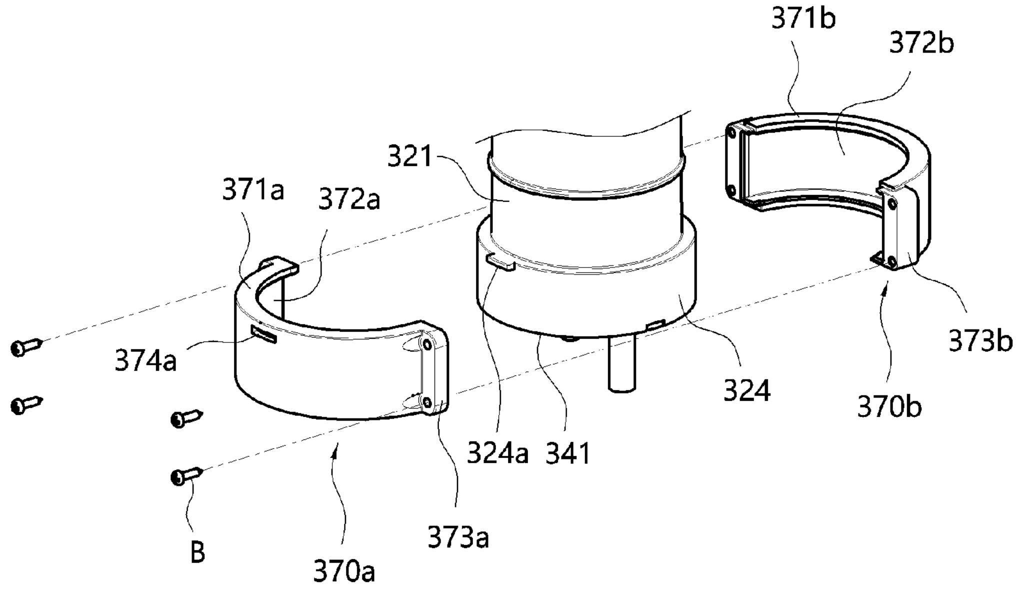
FIG. 9 is a view illustrating an exploded state of a lower clamp assembly at a lower end of the tank of the water purifier according to one embodiment of the present disclosure.

FIG. 8 is an enlarged view of portion D of FIG. 3, and FIG. 9 is a view illustrating an exploded state of a lower clamp assembly at a lower end of the tank of the water purifier according to one embodiment of the present disclosure.

Referring to FIGS. 8 and 9, in the lower clamp assembly 370, a plurality of segments 370*a* and 370*b* are fastened to surround the coupling portion between the lower housing 320 and the lower cap 340. The plurality of segments 370*a* and 370*b* are fastened to surround an upper side, a lower side, and an outer circumferential surface of the coupling portion between the lower housing 320 and the lower cap 340 that protrudes radially outward and thus provide a fastening force in the horizontal direction perpendicular to the height direction of the tank 300. Accordingly, the lower clamp assembly 370 may effectively resist pressure acting in the height direction of the tank 300.

The lower housing 320 further includes a third diameter expansion portion 324 having an expanded diameter and connected to a lower side end of the lower housing body 321, and the lower cap 340 is inserted into and seated on the third diameter expansion portion 324. Due to such a structure, the coupling portion between the lower housing 320 and the lower cap 340 has a form that protrudes radially outward.

Meanwhile, the lower cap 340 has a lower cap body 341 configured to seal the lower portion of the accommodation space and be inserted into the third diameter expansion portion 324 and a third sealing member insertion groove 342 recessed in an outer circumferential surface of the lower cap body 341 in the circumferential direction. A third sealing member 30 is seated on the third sealing member insertion groove 342 to seal between an inner circumferential surface of the third diameter expansion portion 324 and the outer circumferential surface of the lower cap 340. For example, the third sealing member 30 may be an O-ring.

Here, a third seating groove 325 may be provided to be recessed in an inner circumferential surface of a lower end of the third diameter expansion portion 324 in the circumferential direction. An edge of a lower end of the lower cap 340 may be seated on the third seating groove 325. Through such a structure, the lower housing 320 and the lower cap 340 may be stably coupled to each other.

The lower clamp assembly 370 includes a first lower clamp segment 370*a* and a second lower clamp segment 370*b*. The first lower clamp segment 370*a* and the second lower clamp segment 370*b* are each disposed to partially cover the coupling portion between the lower housing 320 and the lower cap 340 in the circumferential direction. In a state in which the first lower clamp segment 370*a* and the second lower clamp segment 370*b* are fastened, the coupling portion between the lower housing 320 and the lower cap 340 is entirely covered.

In one embodiment of the present disclosure, the first lower clamp segment 370*a* has a first lower clamp segment body 371*a* having a semicylindrical shape, a first lower clamp segment groove 372*a* formed to be recessed in an inner circumferential surface of the first lower clamp segment body 371*a*, and a first lower clamp segment fastening portion 373*a* formed to protrude radially outward from both ends of the first lower clamp segment body 371*a*. Also, the second lower clamp segment 370*b* has a second lower clamp segment body 371*b* having a semicylindrical shape, a second lower clamp segment groove 372*b* formed to be recessed in an inner circumferential surface of the second lower clamp segment body 371*b*, and a second lower clamp segment fastening portion 373*b* formed to protrude radially outward from both ends of the second lower clamp segment body 371*b*.

In a state in which the first lower clamp segment 370*a* and the second lower clamp segment 370*b* are disposed to come in contact so that the coupling portion between the lower housing 320 and the lower cap 340 is inserted into the first lower clamp segment groove 372*a* and the second lower clamp segment groove 372*b*, the first lower clamp segment 370*a* and the second lower clamp segment 370*b* are fastened to each other by a fastening member B fastened to pass through the first lower clamp segment fastening portion 373*a* and the second lower clamp segment fastening portion 373*b*. Here, the fastening member B may be fastened in a direction perpendicular to the up-down direction (the height direction of the tank 300), that is, the horizontal direction.

Meanwhile, the first lower clamp segment 370*a* may further have a guide groove 374*a* formed to pass through the first lower clamp segment body 371*a*. Corresponding to the guide groove 374*a*, a guide protrusion 324*a* configured to be inserted into the guide groove 374*a* may be provided on an outer circumferential surface of the third diameter expansion portion 324 of the lower housing 320. The guide groove 374*a* and the guide protrusion 324*a* serve to guide a fastening position of the lower clamp assembly 370. Of course, the second lower clamp segment 370*b* may also have a guide groove, and a guide protrusion corresponding thereto may be provided on the outer circumferential surface of the third diameter expansion portion 324.

The cold water generator 400 cools purified water accommodated in the accommodation space S to generate cold water. In one embodiment of the present disclosure, the cold water generator 400 may include a refrigerant flow path 410 and a compressor 420. In addition, the cold water generator 400 may further include a condenser (not illustrated), one or more valves (not illustrated), and the like disposed in the refrigerant flow path 410.

The refrigerant flow path 410 is provided so that a refrigerant which cools the purified water accommodated in the accommodation space S to generate cold water is introduced through the upper side of the accommodation space S and flows to the upper side of the accommodation space S via the lower portion of the accommodation space S. The refrigerant flowing along the refrigerant flow path 410 in the accommodation space S exchanges heat with the purified water and cools the purified water to generate cold water.

The refrigerant flow path 410 may have a first flow path 411 which extends to the lower portion of the accommodation space S through an upper portion of the tank 300 and allows the refrigerant to flow from the upper portion of the accommodation space S to the lower portion thereof, a second flow path 412 which is connected to the first flow path 411 at the lower portion of the accommodation space S and switches a flow direction of the refrigerant toward the upper side of the accommodation space S, and a third flow path 413 which is connected to the second flow path 412 at the lower portion of the accommodation space S and extends from the lower portion of the accommodation space S to the upper side thereof to allow the refrigerant to flow from the lower portion of the accommodation space S to the upper portion thereof. The third flow path 413 may extend to the outside of the tank 300 through the upper portion of the tank 300.

The compressor 420 provides a flow force to the refrigerant disposed in the refrigerant flow path 410. In one embodiment of the present disclosure, the compressor 420 may be configured to control a flow speed of the refrigerant. For example, the compressor 420 may be configured as an inverter compressor. As described above, a condenser, one or more valves (for example, expansion valves), and the like may be provided in the refrigerant flow path 410 in addition to the compressor 420, and the condenser, one or more valves (for example, expansion valves), and the like may provide a heat exchange circulation structure (heat pump).

The cold water dispensing flow path 500 is provided to dispense the cold water generated in the accommodation space S of the tank 300 to the outside. The cold water dispensing flow path 500 may be provided so that the cold water is discharged to the outside from the upper portion of the accommodation space S through a side surface of the tank 300.

In one embodiment of the present disclosure, the cold water dispensing flow path 500 includes a first dispensing flow path 510 which communicates with the accommodation space S through the lower cap 340, causes the cold water to be discharged to a lower portion of the tank 300, and then switches a flow direction of the cold water to an upward direction to cause the cold water to flow toward a bottom of the accommodation space S, a second dispensing flow path 520 which is connected to the first dispensing flow path 510, extends to the upper side of the accommodation space S, and causes the cold water to flow to the upper portion of the accommodation space S, and a third dispensing flow path 530 which is connected to the second dispensing flow path 520 at the upper portion of the accommodation space S, extends toward a side surface of the accommodation space S to pass through a side surface of the tank 300, and causes the cold water to be discharged to the outside.

In a state in which the refrigerant flow path 410 and the cold water dispensing flow path 500 are disposed as described above, the purified water introduced into the accommodation space S through the purified water supply flow path 200 is cooled while flowing to the lower portion of the accommodation space S and converted into cold water, which causes the density of the water to increase, and cold water that is cooled relatively more moves to a lower side due to convection. Also, cold water that is cooled relatively less may come in contact with the refrigerant flow path 410 and be repeatedly cooled while flowing to the upper side of the accommodation space S.

According to the water purifier 1 according to embodiments of the present disclosure, cooling efficiency may be maximized through the above-described structures and arrangement of the purified water supply flow path 200, the tank 300, the refrigerant flow path 410, and the cold water dispensing flow path 500.

Embodiments of the present disclosure have been described above, but the spirit of the present disclosure is not limited by the embodiments presented herein, and those of ordinary skill in the art who understand the spirit of the present disclosure may easily propose other embodiments by adding other components, changing components, or omitting components within the scope of the same spirit. However, such embodiments also belong to the scope of the spirit of the present disclosure.

The invention claimed is:

1. A water purifier comprising:

a tank providing an accommodation space, which extends in an up-down direction to accommodate purified water generated by filtering raw water and of which the maximum length in a height direction is at least three times the maximum length in a width direction or more, and provided so that the purified water is introduced through an upper side of the accommodation space;

a cold water generator configured to cool the purified water accommodated in the accommodation space and generate cold water; and a cold water dispensing flow path provided to dispense the cold water generated in the accommodation space to the outside, wherein the tank includes an upper housing having a cylindrical shape that extends in the up-down direction and providing an upper portion of the accommodation space, a lower housing having a cylindrical shape that extends in the up-down direction and connected to a lower portion of the upper housing to provide a lower portion of the accommodation space, an upper cap coupled to an upper side end of the upper housing to seal the accommodation space from outside air, and a lower cap coupled to a lower side end of the lower housing to seal the accommodation space from the outside air, a coupling portion between the upper housing and the upper cap, a coupling portion between the upper housing and the lower housing, and a coupling portion between the lower housing and the lower cap protrude radially outward past portions adjacent thereto, and the tank further includes an upper clamp assembly in which a plurality of segments are fastened to surround the coupling portion between the upper housing and the upper cap, an intermediate clamp assembly in which a plurality of segments are fastened to surround the coupling portion between the upper housing and the lower housing, and a lower clamp assembly in which a plurality of segments are fastened to surround the coupling portion between the lower housing and the lower cap.

2. The water purifier of claim 1, wherein the plurality of segments of each of the upper clamp assembly, the intermediate clamp assembly, and the lower clamp assembly have a groove provided at an inner circumferential surface thereof, and the coupling portion between the upper housing and the upper cap, the coupling portion between the upper housing and the lower housing, and the coupling portion between the lower housing and the lower cap are inserted into the grooves.

3. The water purifier of claim 1, wherein the plurality of segments of each of the upper clamp assembly, the intermediate clamp assembly, and the lower clamp assembly are fastened in a direction perpendicular to the height direction of the tank.

4. The water purifier of claim 1, wherein the upper housing includes a first diameter expansion portion provided with an expanded diameter at the upper side end, and the upper cap is inserted into and seated on the first diameter expansion portion.

5. The water purifier of claim 4, wherein:

the upper cap has a first sealing member insertion groove provided in an outer circumferential surface in a circumferential direction; and the tank further includes a first sealing member seated on the first sealing member insertion groove to seal between an inner circumferential surface of the first diameter expansion portion and the outer circumferential surface of the upper cap.

6. The water purifier of claim 4, wherein the upper housing further includes a first seating groove provided to be recessed in an inner circumferential surface of an upper end of the first diameter expansion portion in a circumferential direction, and an edge of an upper end of the upper cap is seated on the first seating groove.

7. The water purifier of claim 1, wherein the lower housing includes a second diameter expansion portion provided with an expanded diameter at an upper side end, and a lower side end of the upper housing is inserted into and seated on the second diameter expansion portion.

8. The water purifier of claim 7, wherein:

the upper housing has a second sealing member insertion groove provided in an outer circumferential surface of the lower side end in a circumferential direction; and the tank further includes a second sealing member seated on the second sealing member insertion groove to seal between an inner circumferential surface of the second diameter expansion portion and the outer circumferential surface of the lower side end of the upper housing.

9. The water purifier of claim 7, wherein the lower housing further includes a second seating groove provided to be recessed in an inner circumferential surface of an upper end of the second diameter expansion portion in a circumferential direction, and the upper housing further includes a flange provided at the lower side end and seated on the second seating groove.

10. The water purifier of claim 1, wherein the lower housing includes a third diameter expansion portion provided with an expanded diameter at the lower side end, and the lower cap is inserted into and seated on the third diameter expansion portion.

11. The water purifier of claim 10, wherein:

the lower cap has a third sealing member insertion groove provided in an outer circumferential surface in a circumferential direction; and the tank further includes a third sealing member seated on the third sealing member insertion groove to seal between an inner circumferential surface of the third diameter expansion portion and the outer circumferential surface of the lower cap.

12. The water purifier of claim 10, wherein the lower housing further includes a third seating groove provided to be recessed in an inner circumferential surface of a lower end of the third diameter expansion portion in a circumferential direction, and an edge of a lower end of the lower cap is seated on the third seating groove.

13. The water purifier of claim 1, wherein the cold water generator includes:

a refrigerant flow path provided so that a refrigerant which cools the purified water accommodated in the accommodation space to generate cold water is introduced through the upper side of the accommodation space and flows to the upper side of the accommodation space via the lower portion of the accommodation space; and a compressor configured to provide a flow force to the refrigerant disposed in the refrigerant flow path.

14. The water purifier of claim 1, wherein the cold water dispensing flow path includes:

a first dispensing flow path which communicates with the accommodation space through the lower cap, causes the cold water to be discharged to a lower portion of the tank, and then switches a flow direction of the cold water to an upward direction to cause the cold water to flow toward a bottom of the accommodation space;

a second dispensing flow path which is connected to the first dispensing now path, extends to the upper side of the accommodation space, and causes the cold water to flow to the upper portion of the accommodation space; and a third dispensing flow path which is connected to the second dispensing now path at the upper portion of the accommodation space, extends toward a side surface of the accommodation space to pass through a side surface of the tank, and causes the cold water to be discharged to the outside.

* * * * *